United States Patent [19]

Langlois

[11] Patent Number: 5,092,291

[45] Date of Patent: Mar. 3, 1992

[54] INTERNAL-COMBUSTION ENGINE OIL DEFLECTING PART

[75] Inventor: Karl Langlois, Weissach-Flacht, Fed. Rep. of Germany

[73] Assignee: Dr. Ing. h.c.F. Porsche AG, Fed. Rep. of Germany

[21] Appl. No.: 642,453

[22] Filed: Jan. 17, 1991

[30] Foreign Application Priority Data

Jan. 19, 1990 [DE] Fed. Rep. of Germany ....... 4001470

[51] Int. Cl.⁵ .............................................. F16J 15/00
[52] U.S. Cl. ................................. 123/196 R; 277/180
[58] Field of Search ...... 123/196 R, 196 CP, 196 AB, 123/193 CH; 184/106, 6.5; 277/166, 209, 211, 180, 235 B

[56] References Cited

U.S. PATENT DOCUMENTS

| | | | |
|---|---|---|---|
| 3,653,464 | 4/1972 | Jacobsen et al. | 184/106 |
| 4,134,380 | 1/1979 | Niwa et al. | 184/6.5 |
| 4,296,716 | 10/1981 | Hofbauer et al. | 123/196 AB |
| 4,519,348 | 5/1985 | Hamilton | 123/196 R |
| 4,625,979 | 12/1986 | Inciong | 277/180 |
| 4,909,203 | 3/1990 | Fukuo | 123/196 R |

FOREIGN PATENT DOCUMENTS

| | | |
|---|---|---|
| 0148484 | 7/1985 | European Pat. Off. . |
| 1477460 | 4/1967 | France . |
| 5888416 | 5/1983 | Japan . |
| 60-62617 | 4/1985 | Japan . |
| 0852413 | 10/1960 | United Kingdom . |

OTHER PUBLICATIONS

ATZ Automobiltechnische Zeitschrift 89(1987)2 Opel Omega-Teil 2: Fahrwerk und Antriet Freidrich W. Lohr, pp. 63-72, Jan. 1987.

*Primary Examiner*—E. Rollins Cross
*Assistant Examiner*—M. Macy
*Attorney, Agent, or Firm*—Evenson, Wands, Edwards, Lenahan & McKeown

[57] ABSTRACT

A dish-shaped oil deflecting part is arranged in a separating seam of an internal-combustion engine bordering on an oil pan and has a seal integrated into a flange-shaped boundary of the oil deflecting part. The oil deflecting part simplifies mounting and reduces the component expenditures for sealing off the parting seam.

7 Claims, 2 Drawing Sheets

INTERNAL-COMBUSTION ENGINE OIL DEFLECTING PART

BACKGROUND AND SUMMARY OF THE INVENTION

The present invention relates to an internal-combustion engine oil deflecting part which is fastened in a parting seem bordering an oil pan.

*Automobiltechnische Zeitschrift* ATZ 89, 1987, No. 2, Page 69, describes an oil deflecting part constructed as a so-called oil lathe. On its outer boundary, this oil lathe has a surrounding flange and, by means of this flange, is arranged between the cylinder block and the oil pan of an internal-combustion engine. The disadvantage of this construction is the fact that the oil lathe constitutes a separate component which, before the mounting of the oil pan on the cylinder block, must be mounted in addition to a conventional seal which prevents a leaking of oil out of the parting seam of the oil pan and the cylinder block and that a second sealing device is required which seals off the parting seam between the oil lathe and the oil pan and between the oil lathe and the cylinder block.

It is an object of the present invention to provide an improved oil deflecting part for an internal-combustion engine which avoids the above-mentioned expenditures and ensures a simple and cost-saving mounting.

This object has been achieved in accordance with the present invention by providing seals integrated into the oil deflecting part.

A principal advantage of the present invention is that a component is eliminated when the oil pan is mounted on the cylinder block because the oil deflecting part, due to the integrated sealing devices also acts as a seal. The mounting of the oil deflecting part therefore, at the same time, ensures a sealing-off of the sealing surfaces, on one hand, between the oil deflecting part and the oil pan and, on the other hand, between the oil deflecting part and the crankcase. The sealing takes place via a seal which is inserted into a flange-shaped boundary which surrounds the oil deflecting part. This seal is effective on both sides of the boundary. The mounting therefore requires less components and less time.

BRIEF DESCRIPTION OF THE DRAWINGS

These and further objects, features and advantages of the present invention will become more apparent from the following detailed description of presently preferred embodiments when taken in conjunction with the accompanying drawings wherein.

DETAILED DESCRIPTION OF THE DRAWINGS

Figure 1:
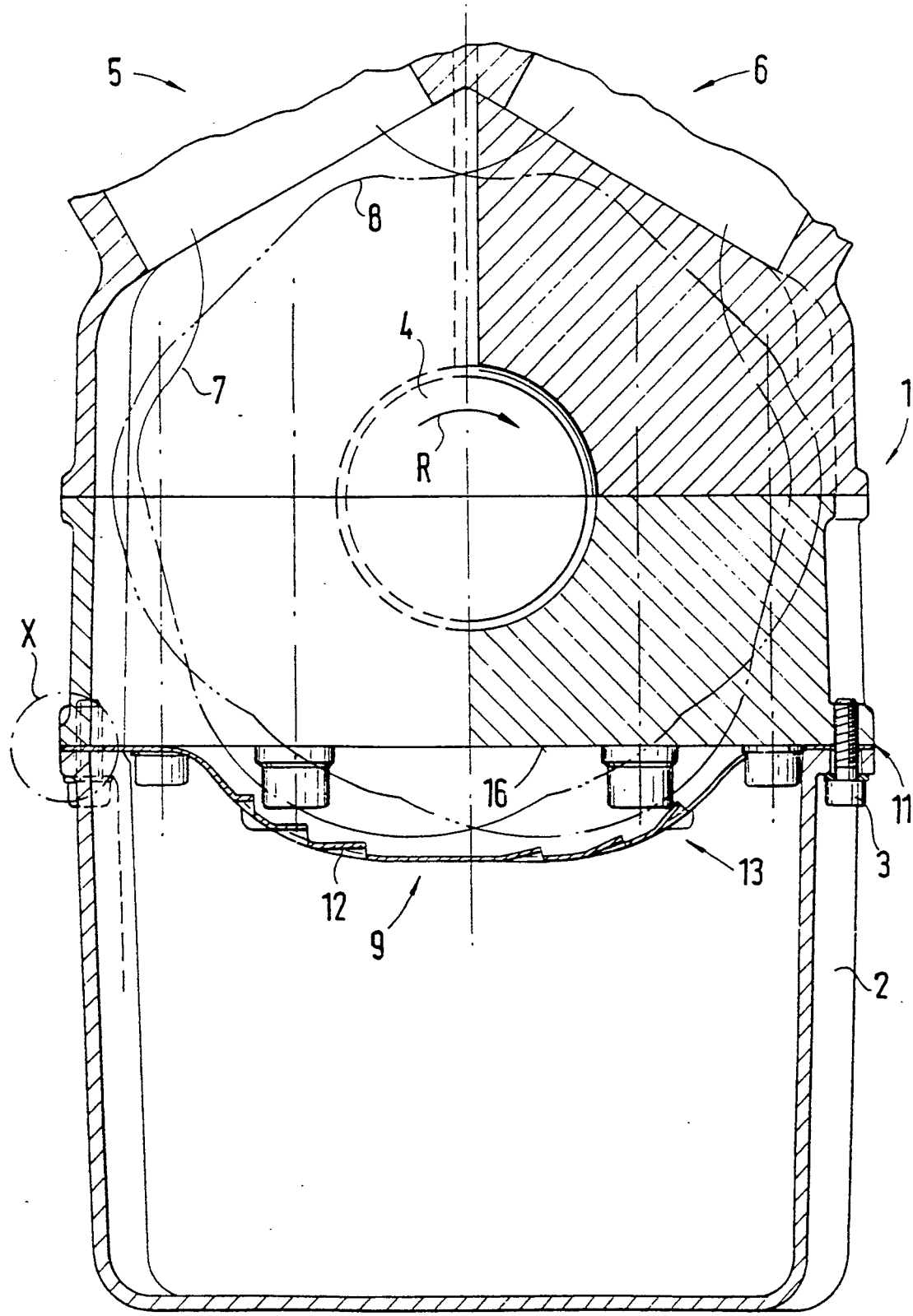
FIG. 1 is a cross-sectional view of a crankcase with an oil pan of an internal-combustion engine connected by way of sealing devices in accordance with the present invention.

An oil pan 2 is fastened to the crankcase 1 of an internal-combustion engine by screws 3. A crankshaft 4 is disposed in the crankcase 1 and has a rotational direction indicated by the arrow R. The internal-combustion engine also has two cylinder banks 5, 6 which are arranged in a V-shape with respect to one another. The cylinders of the banks 5, 6, which cylinders are not shown in detail, receive pistons which are connected with the crankshaft 4 by connecting rods. The cardioid curves 7, 8 reflect the envelopes of the connecting rods rotating with the crankshaft 4.

An oil deflecting part 9 extends closely below the cardioid curves 7, 8. The outer boundary 10 (FIGS. 2, 3 and 4) of the oil deflecting part 9 is flange shaped and, in the installed condition of the oil deflecting part 9, is braced in the parting seam 11 between the oil pan 2 and the crankcase 1 by the screws 3.

In areas of the smallest distance between the oil deflecting part 9 and the cardioid curves 7, 8, notches 12 are arranged in the pan-shaped area 13 of the oil deflecting part 9 to catch the lubricating oil thrown off the crank drive and guide it through the oil deflecting part 9 into the oil pan 2.

On the boundary 10, a surrounding seal 14 protects the sealing surface between the top side 15 of the oil deflecting part 9 situated in the parting seam 11 and the lower end surface 16 of the crankcase 1 as well as the sealing surface between the underside 17 of the oil deflecting part 9 and the top side of the oil pan 2 with respect to leaking oil.

Figure 2:
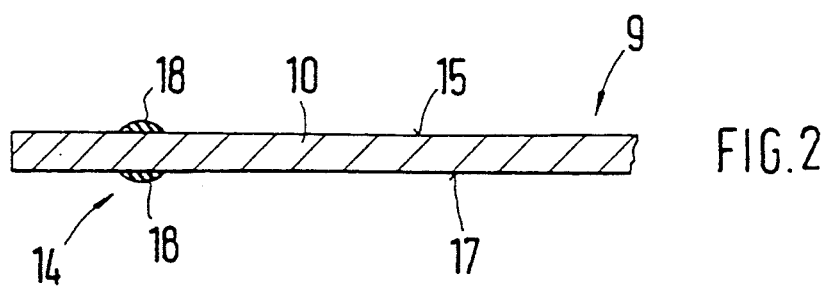
FIG. 2 is an enlarged detail X shown in a dashed circle in FIG. 1 of a first embodiment of the present invention.
Figure 3:
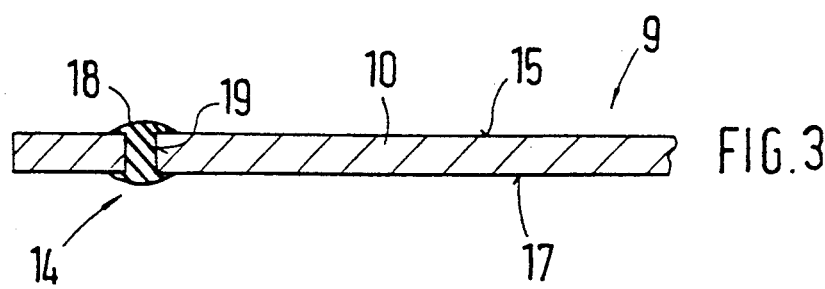
FIG. 3 is an enlarged detail X shown in a dashed circle in FIG. 1 of a second embodiment of the present invention.
Figure 4:
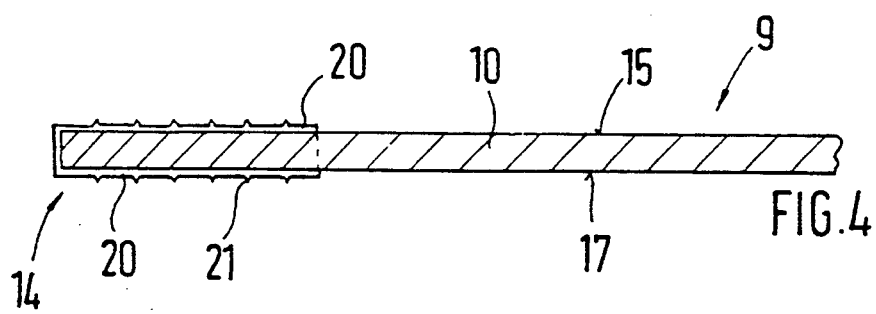
FIG. 4 is an enlarged detail X shown in a dashed circle in FIG. 1 of a third embodiment of the present invention.

As illustrated in FIGS. 2 to 4, the seal 14 may have several embodiments. FIG. 2 shows a divided seal 14 which, in each case, in the form of an elastomer applied as beads, extends on the top side 15 and the bottom side 17 of the boundary 10. In this case, several seals 14 may be arranged parallel with respect to one another to increase the sealing effect.

FIG. 3 shows a seal 14 in which the beads 18 are connected with one another by way of several breakthroughs 19 arranged along the circumference of the boundary 10.

In FIG. 4, the seal 14 is a U-shaped part in its cross-section and is fitted onto the boundary 10 from the outside. Several sealing lips 21 pointing toward the outside are arranged on legs 20 of this seal 14 which rest closely against the top side 15 and the bottom side 17.

The oil deflecting part 9 may be manufactured in any number of desired configurations as a deep-drawn part made of metal with the notches 12. The wall thickness of approximately 0.7 to 1.2 mm which is required for an oil deflecting part corresponds to the thickness of conventionally used separate seals so that the overall height of the internal-combustion engine does not change.

If necessary, the oil deflecting part 9 may be plastic, in which case preferably a seal 14 according to FIG. 4 is used. In such a case, the part 9 may be molded or made from a plastic that is provided with fillers, such as fiberglass or carbon fiber.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An internal-combustion engine dish-shaped oil deflecting part adapted to be fastened in a parting seam bordering on an oil pan, wherein a single elastomer seal is arranged between a lower end face of an internal combustion engine crankcase and a top side of the oil deflecting part as well as between a bottom side of the oil deflecting part and the oil pan so as to be integrated into the oil deflecting part which has a flange-shaped boundary on its outer circumference by virtue of the single seal being arranged closely against the top and bottom side of the oil deflecting part.

2. The oil deflecting part according to claim 1, wherein the single elastomer seal comprises several parts in the form of beads, and several breakthroughs are arranged in the boundary in which opposed beads of the single seal are connected with one another.

3. The oil deflecting part according to claim 1, wherein the single at least one seal is U-shaped and has parallel legs to rest closely against the top side and the bottom side of the boundary.

4. The oil deflecting part according to claim 3, wherein several sealing lips extending parallel and are arranged on the legs.

5. The oil deflecting part according to claim 1, wherein the oil deflecting part is a metallic deep-drawn part and notches are arranged in a pan-shaped area enclosed by the boundary.

6. The oil deflecting part according to claim 1, wherein the oil deflecting part is a molded plastic part.

7. The oil deflecting part according to claim 1, wherein the oil deflecting part is a plastic part provided with fillers.

* * * * *